(12) United States Patent
Gilbert

(10) Patent No.: US 9,234,705 B2
(45) Date of Patent: Jan. 12, 2016

(54) SCALEABLE CAPACITY INDIRECT EVAPORATIVE COOLER

(71) Applicant: F F Seeley Nominees Pty. Ltd., Lonsdale (AU)

(72) Inventor: Rob Gilbert, Willunga (AU)

(73) Assignee: F.F. Seeley Nominees Pty Ltd, St. Marys South (AU)

( * ) Notice: Subject to any disclaimer, the term of this patent is extended or adjusted under 35 U.S.C. 154(b) by 287 days.

(21) Appl. No.: 13/935,982

(22) Filed: Jul. 5, 2013

(65) Prior Publication Data

US 2014/0182316 A1 Jul. 3, 2014

(30) Foreign Application Priority Data

Jan. 3, 2013 (AU) ................................ 2013200027

(51) Int. Cl.
 *A47F 3/04* (2006.01)
 *F28C 3/08* (2006.01)
 *F24F 5/00* (2006.01)
 *F24F 1/00* (2011.01)

(52) U.S. Cl.
 CPC ................. *F28C 3/08* (2013.01); *F24F 5/0035* (2013.01); *F24F 2001/0092* (2013.01)

(58) Field of Classification Search
 CPC ......... F24F 3/14; F24F 5/0035; Y02B 30/545
 USPC ................................. 62/259.4, 310, 314, 316
 See application file for complete search history.

(56) References Cited

U.S. PATENT DOCUMENTS

| 2005/0132738 | A1* | 6/2005 | Bourne et al. | 62/310 |
|---|---|---|---|---|
| 2008/0116592 | A1 | 5/2008 | James | |
| 2009/0126913 | A1* | 5/2009 | Lee et al. | 165/110 |
| 2011/0302946 | A1* | 12/2011 | Gilbert | 62/304 |

* cited by examiner

*Primary Examiner* — Melvin Jones
(74) *Attorney, Agent, or Firm* — Tarolli, Sundheim, Covell & Tummino LLP

(57) ABSTRACT

A scaleable indirect evaporative cooler system (10) fitted within a container incorporates a plurality of dry and wet passage heat exchangers (30) where the dry passages of the plurality of heat exchangers feed into a common space (32) from which conditioned air is delivered via a delivery fan (40) downstream of the dry passages of the heat exchangers. An exhaust fan 22 draws air from the common space (32) through the wet passages of the heat exchanger to a common exhaust space (34) before being exhausted to atmosphere via the exhaust fan (22).

20 Claims, 3 Drawing Sheets

SECTION A-A

SCALEABLE CAPACITY INDIRECT EVAPORATIVE COOLER

CROSS-REFERENCES TO RELATED APPLICATIONS

The present application claims foreign priority benefits under 35 U.S.C. 119(a)-(d) to currently pending Australian Patent Application No. 2013200027 filed 3 Jan. 2013 entitled SCALEABLE CAPACITY INDIRECT EVAPORATIVE COOLER. The present application claims priority the above-identified patent application, which is incorporated in its entirety herein by reference for all purposes.

TECHNICAL FIELD

This invention relates to evaporatively cooled heat exchangers utilised in the cooling of air for the comfort cooling of buildings. These heat exchangers are generally constructed from adjacent wet and dry passages arranged such that air through the adjacent passages flows in relative counter flow. The present invention is applicable to the cooling of a large range of spaces from relatively small to, say, such as commercial or industrial buildings. In particular the present invention relates to a method and means for varying output capacity of an evaporative cooler by being readily scaleable.

BACKGROUND ART

Throughout this description and the claims which follow, unless the context requires otherwise, the word "comprise", or variations such as "comprises" or "comprising", will be understood to imply the inclusion of a stated integer or step or group of integers or steps.

The reference to any prior art in this specification is not, and should not be taken as, an acknowledgement or any form of suggestion that that prior art forms part of the common general knowledge in Australia.

An indirect evaporative cooler is described in our co-pending Australian patent application 2012900025, the contents of which are incorporated herein by reference. In the specification of that co-pending application there is shown a cooler using a known evaporative heat exchanger but employing separately controllable fans for the dry passage inlet or supply air ducts and the exhaust air duct. The advantages of the FIG. 4 embodiment thereof are to provide a more compact indirect evaporative cooler in which there is less wastage of energy in the driving of the air flows required for its operation, and ready controllability over a range of operating conditions by means of a controller controlling one or both of the fans. The invention described in AU 2012900025 builds upon earlier developments in the construction of a heat exchanger as disclosed in WO2006074508.

The FIG. 4 embodiment described in our aforementioned co-pending Australian patent application presents an opportunity to combine a plurality of indirect evaporative heat exchangers into a single unit, with manifolded supply air and exhaust air to form large scale coolers capable of supplying indirectly evaporatively cooled air in relatively large quantities for a range of cooling loads up to such as for commercial or industrial buildings.

DISCLOSURE OF INVENTION

In accordance with a first aspect of the present invention there is provided an indirect evaporative cooler system in which air flow in interspersed wet and dry passages of each of a plurality of evaporative heat exchangers is in respective counter flow, said plurality of evaporative heat exchangers being incorporated in a container and combining for the delivery of relatively large volumes of cool conditioned air, and wherein the air flow through the dry passages is controlled by means of interconnected first cavity spaces downstream of the dry passages held at a required pressure by shared delivery fans in said first cavity spaces and the air flow through the wet passages is controlled by interconnected second cavity spaces held at a predetermined pressure by shared exhaust fans in said second cavity spaces.

In a second aspect the present invention provides a method of delivering varying quantities of cool conditioned air via a plurality of evaporative heat exchangers in which air flow in interspersed wet and dry passages of each of the plurality is in respective counter flow, said method comprising drawing air to be cooled through the dry passages of the plurality via a first fan downstream of the dry passages which then delivers a portion of that dry passage air as supply air, drawing the remainder of the dry passage air through the wet passages of each of the plurality via a second fan downstream of the wet passages and delivering the exiting wet passage air to exhaust.

BRIEF DESCRIPTION OF DRAWINGS

The present invention will now be described by way of example with reference to the accompanying drawings, in which.

BEST MODES

Figure 1:
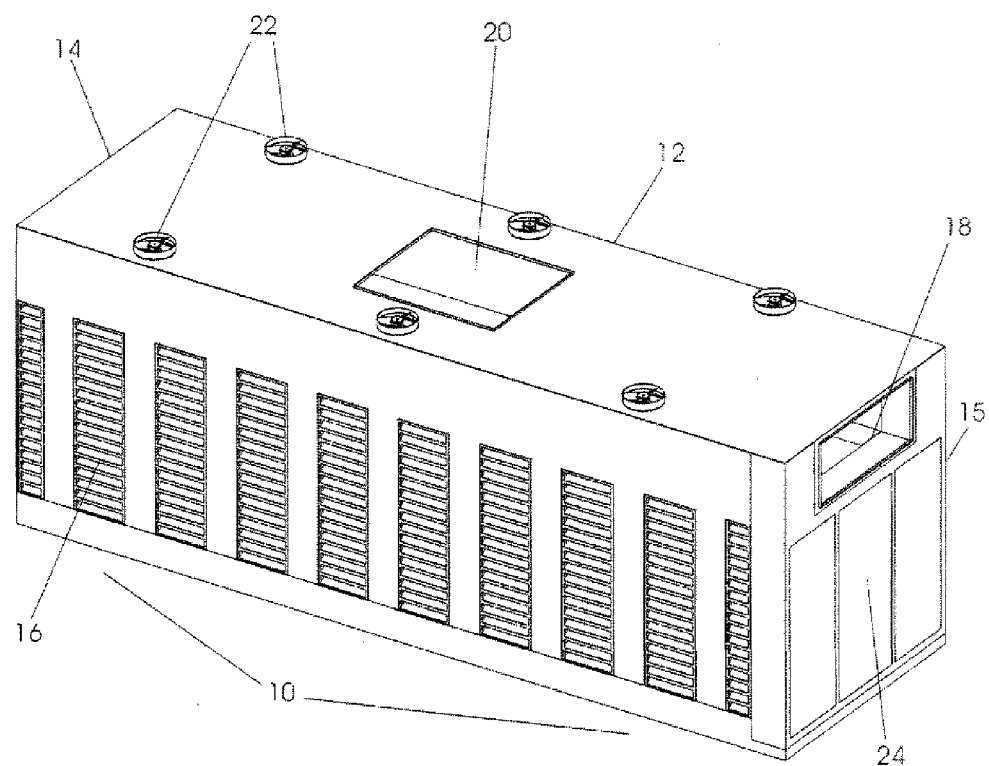
FIG. 1 is an isometric view of a multi-unit indirect evaporative cooler formed by combining multiple heat exchangers to provide a single manifold carrying air supply output.

FIG. 1 shows the overall construction of a multi-unit indirect evaporative cooler 10 in accordance with an embodiment of the present invention where multiple indirect evaporative heat exchanger units sized to fit within the confines of a typical contained space, say, for example a shipping container. The lengths of edges 12, 14 and 15 may be those typical of a standard shipping container, although the design is not restricted to incorporation into such a container as other containers may be more suitable depending upon the application.

In the drawings, the depicted indirect cooler is arranged such that outside ambient air is taken in through louvres 16, typically along the long side face of the container. There may also be a similar arrangement of louvres along the opposite side of the container, provided the overall dimensions of the container are such as to allow the inclusion of a double row of indirect cooler heat exchangers. Air which has been cooled and conditioned by the indirect cooler 10 is typically delivered through outlet 20, although other arrangements for discharge of cooled air are possible. Exhaust fans 22 draw warm, humid exhaust air from each indirect evaporative heat exchanger (as described in our AU 2012900025) and discharge same to atmosphere. A compartment 24 on the end of the container is provided for the inclusion of electrical connections and controllers, and for water pumping equipment for the heat exchangers.

Figure 3:
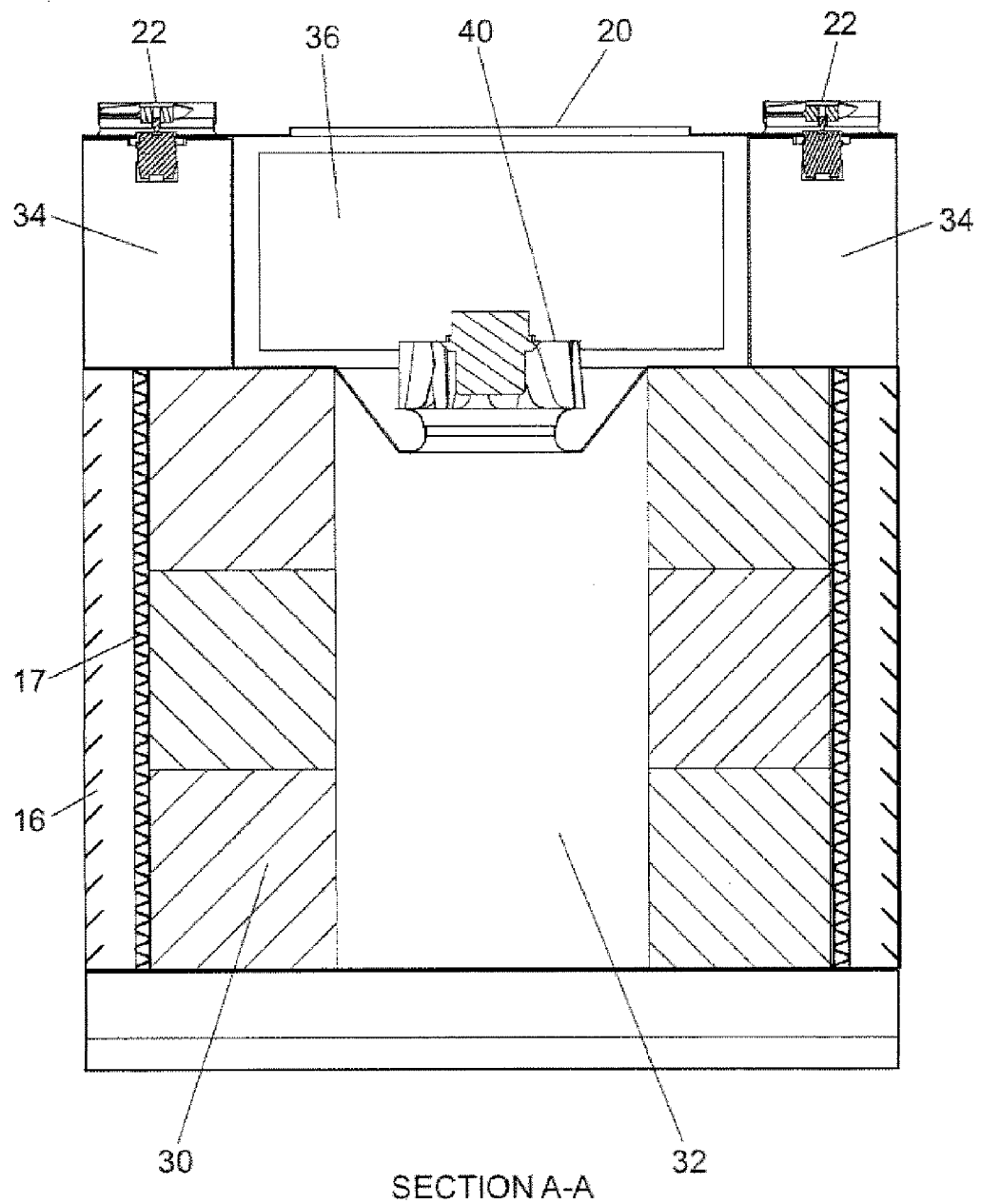
FIG. 3 is a cross-sectional view A-A of FIG. 2.

The section view of FIG. 3 shows the interior details of a typical embodiment of this invention. Indirect evaporative heat exchangers 30 are arranged close to the long side face defined by edge 12 of the container, with a heat exchanger associated with each intake louvre 16. From a practical point to view, sufficient space must be allowed between heat exchangers to facilitate removal for servicing and for ease of assembly. Heat exchangers may also be stacked vertically as shown provided sufficient space is allowed around each heat exchange module for the collection and discharge of the warm, humid exhaust.

Figure 2:
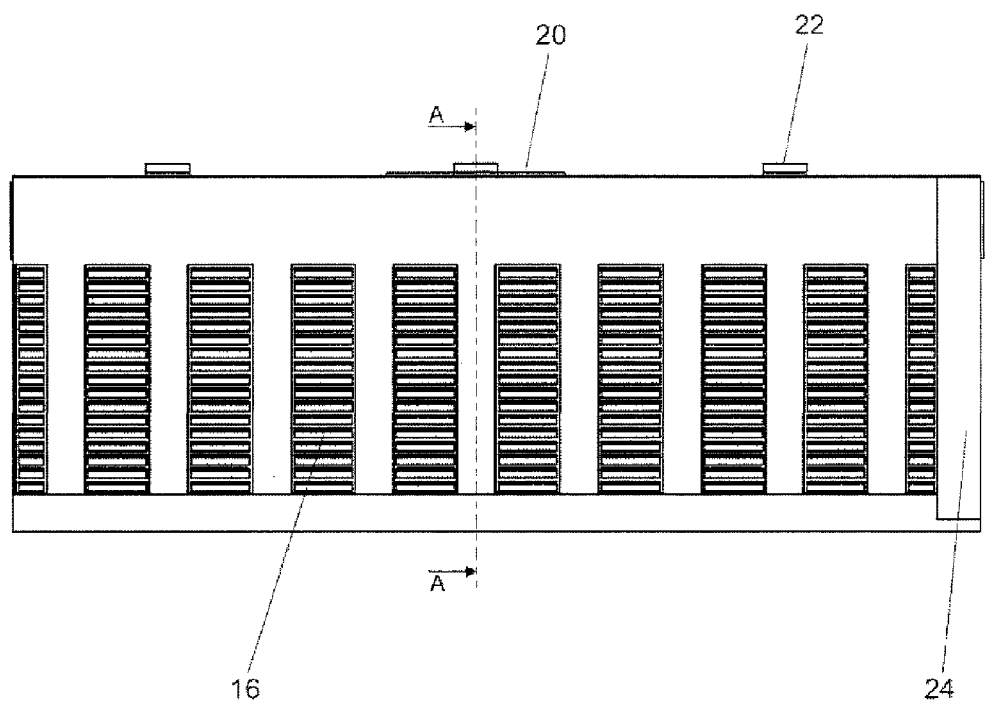
FIG. 2 is a side elevation view of the indirect evaporative cooler of FIG. 1.

Outside, ambient air enters the heat exchangers through louvres 16. An optional air filter cartridge 17 may also be included to ensure the cleanliness of air finally delivered to a space to be conditioned. Air flows through the dry passages of heat exchangers 30 into cavity space or plenum 32, held at a pressure below atmospheric pressure by air supply delivery fan(s) 40. Cavity space 34 is connected to the outlets of the wet air passages of heat exchangers 30. Exhaust fan(s) 22 keep cavity space 34 at a low pressure sufficient to provide a pressure differential between cavity space 32 and the outside ambient such that a required air flow rate is achieved from space 32 through the wet passages of the heat exchangers 30 to space 34 and then to exhaust to external ambient via fans 22.

Where the container size for cooler 10 is sufficient, a symmetric row of heat exchangers may also be arranged on the opposite side of the container, discharging into shared cavity spaces 32 as depicted by the embodiment of FIGS. 1-3.

Delivery fan(s) 40 draws off that proportion of air not directed to the wet passages, and exhausted to atmosphere via fans 22, to the outlet plenum or cavity 36, from where it can be delivered through opening 20 as cool, conditioned air to a space to be conditioned, or alternatively the conditioned air can be delivered via opening 18 on one or both ends of the container.

As shown, it is not necessary that there be a single delivery fan 40 or a single exhaust fan 22 associated with each heat exchange unit as each fan 40 may be associated with the operation of a plurality of heat exchangers 30 and similarly for exhaust fans 22 as shown in the embodiment. This further aids in design flexibility and potential capital cost savings.

The basic arrangement of multiple heat exchange units as depicted can be scaled up or down to fill almost any size of container. A typical shipping container may, for example, require up to eight sets of side-by-side heat exchangers on each of the long sides of the container, thereby delivering large quantities of cooled conditioned air to suit the cooling load of a relatively large space to be conditioned.

The basic principles of this arrangement of components of an indirect evaporative cooling system may be applied to a wide range of container sizes to match specific cooling requirements. The result can be a compact, self contained and readily transportable indirect evaporative cooling system customised to achieve the cooling load to be met.

By providing a plurality of stand alone modular heat exchange units they can be readily adapted to fit a range of containers almost on a plug-in basis. The ease of fitting out such as a shipping container and having it readily transportable to where it is needed provides a level of flexibility in conditioning relatively large remote spaces that has not previously been available.

The invention claimed is:

1. An indirect evaporative cooler system in which air flow in interspersed wet and dry passages of each of a plurality of evaporative heat exchangers is in respective counter flow, said plurality of evaporative heat exchangers being incorporated in a container and combining for a delivery of relatively large volumes of cool conditioned air, and wherein the air flow through the dry passages is controlled by means of interconnected first cavity spaces downstream of the dry passages held at a required pressure by at least one shared delivery fan in said first cavity spaces and the air flow through the wet passages is controlled by interconnected second cavity spaces held at a predetermined pressure by at least one shared exhaust fan in said second cavity spaces.

2. A cooler system as claimed in claim 1, including louvred inlets in a side of the container via which inlet air, to be conditioned, feeds into an adjacent heat exchanger associated with each louvred inlet.

3. A cooler system as claimed in claim 1, wherein the container is a shipping container.

4. A cooler system as claimed in claim 1, comprising side-by-side heat exchangers mounted within said container extending across opposite long sides of the container.

5. A method of delivering varying quantities of cool conditioned air via a plurality of evaporative heat exchangers in which air flow in interspersed wet and dry passages of each of the plurality of evaporative heat exchangers is in respective counter flow, said method comprising drawing air to be cooled through the dry passages of the plurality of evaporative heat exchangers via at least first fan downstream of the dry passages which then delivers a portion of that dry passage air as supply air, drawing the remainder of the dry passage air through the wet passages of each of the plurality of evaporative heat exchangers via at least a second fan downstream of the wet passages and delivering the exiting wet passage air to exhaust.

6. A method as claimed in 5, including filtering external ambient inlet air prior to entry thereof into the dry passages.

7. A cooler system as claimed in claim 2, wherein the container is a shipping container.

8. A cooler system as claimed in claim 2, comprising side-by-side heat exchangers mounted within said container extending across opposite long sides of the container.

9. A cooler system as claimed in claim 3, comprising side-by-side heat exchangers mounted within said container extending across opposite long sides of the container.

10. A cooler system as claimed in claim 7, comprising side-by-side heat exchangers mounted within said container extending across opposite long sides of the container.

11. An evaporative cooler system comprising:
    a container;
    a plurality of evaporative heat exchangers housed inside the container, each of the evaporative heat exchangers having adjacent wet and dry passages arranged such that air through adjacent passages flows in counter flow;
    a plurality of interconnected first cavity spaces provided inside the container and in fluid communication with the dry passages;
    at least one first fan for holding the first cavity spaces at a first pressure below an ambient pressure outside the container;
    a plurality of interconnected second cavity spaces provided inside the container and in fluid communication with the wet passages, the second cavity spaces being separate from the first cavity spaces; and
    at least one second fan for holding the second cavity spaces at a second pressure, the second pressure being lower than the first pressure.

12. The evaporative heat cooler system as claimed in claim 11, wherein the first pressure controls air flow through the dry passages.

13. The evaporative heat cooler system as claimed in claim 11, wherein the second pressure controls air flow through the wet passages.

14. The evaporative heat cooler system as claimed in claim 11, wherein the container has a plurality of louvers in fluid communication with the first cavity spaces.

15. The evaporative cooler system as claimed in claim 14, wherein each of the louvers is provided with an air filter cartridge.

16. The evaporative cooler system as claimed in claim 11, wherein the container has at least one conditioned air opening in fluid communication with the second cavity spaces.

17. The evaporative cooler system as claimed in claim 16, wherein the at least one first fan is arranged to draw off a proportion of air from the first cavity spaces and deliver the proportion of air through the conditioned air opening.

18. The evaporative cooler system as claimed in claim 17, wherein the proportion of air correlates to the pressure differential between the first pressure and the second pressure.

19. The evaporative heat cooler system as claimed in claim 11, wherein the at least one second fan is arranged to draw air from the second cavity spaces and deliver the air to a space outside the container.

20. The evaporative heat cooler system as claimed in claim 11, wherein the container is a shipping container and the heat exchangers are arranged extending along opposite long sides of the shipping container.

\* \* \* \* \*